United States Patent [19]
Burgess, Jr.

[11] 3,964,715
[45] June 22, 1976

[54] FLESH AND SKIN SEPARATING APPARATUS AND METHOD FOR FRUIT AND VEGETABLE PRODUCTS

[75] Inventor: Ralph D. Burgess, Jr., Excelsior, Minn.

[73] Assignee: Food Engineering Corporation, Minneapolis, Minn.

[22] Filed: Aug. 9, 1974

[21] Appl. No.: 496,079

[52] U.S. Cl. .................................. 241/7; 99/585; 241/86
[51] Int. Cl.² ..................... A23N 7/02; B02C 4/30; B07C 4/40
[58] Field of Search .................... 241/7, 85, 86, 23; 99/585, 586

[56] References Cited
UNITED STATES PATENTS

| | | |
|---|---|---|
| 1,327,254 | 1/1920 | Remmers .............................. 241/85 |
| 2,788,732 | 4/1957 | Templeton ........................ 241/85 X |
| 3,122,986 | 3/1964 | Stone ................................ 241/85 X |
| 3,356,119 | 12/1967 | Kirkpatrick et al .................... 241/85 |
| 3,818,821 | 6/1974 | Kendall ............................. 99/584 X |

*Primary Examiner*—Roy Lake
*Assistant Examiner*—E. F. Desmond
*Attorney, Agent, or Firm*—Schroeder, Siegfried, Ryan & Vidas

[57] ABSTRACT

A flesh and skin separating device for fruit and vegetable products utilizing a rotating pneumatic tire bearing against the circumference of a perforated drum and driving the flesh of such products, previously doctored upon the drum surface, through the perforations of the drum while the skins thereof remain upon the exterior surface of the drum. Means is provided for adjusting the distance between the parallel axes of the drum and tire. Means is also provided for adjusting the pneumatic pressure of the tire while it is rotating.

26 Claims, 9 Drawing Figures

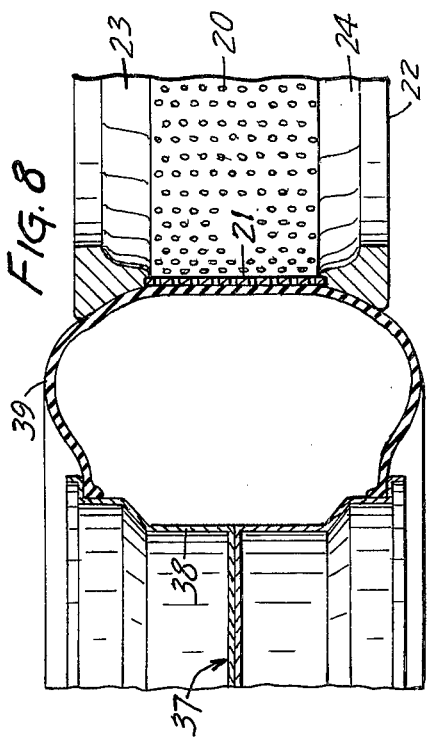
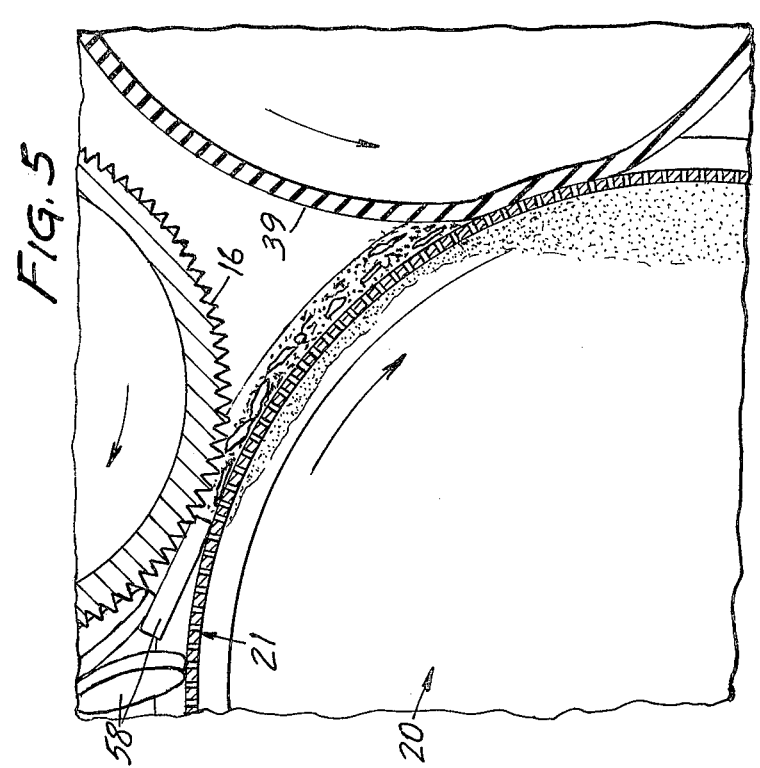
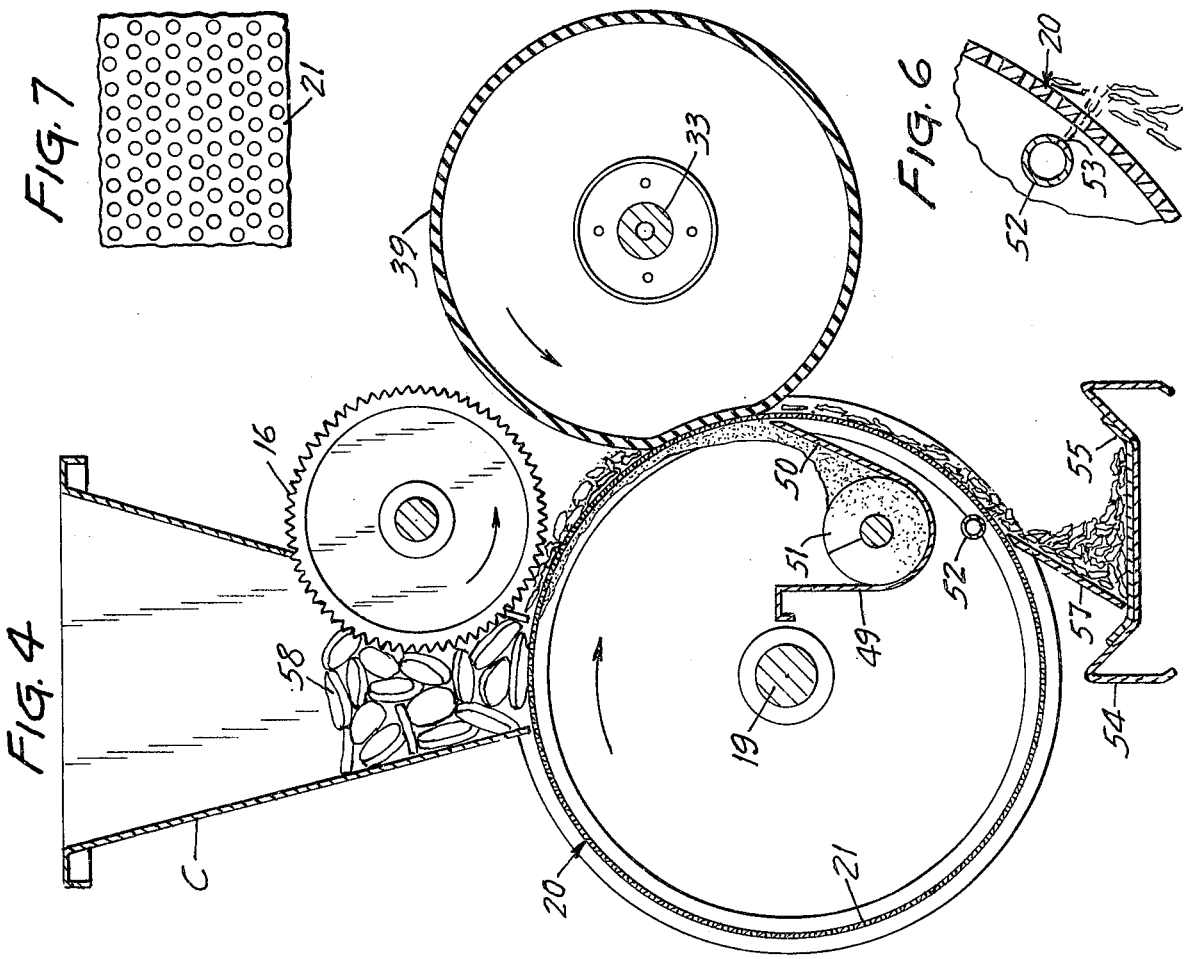

FLESH AND SKIN SEPARATING APPARATUS AND METHOD FOR FRUIT AND VEGETABLE PRODUCTS

It is the general object of my invention to provide novel and improved methods and apparatus for separating skins, hard spots, etc, from the flesh of vegetable and fruit products.

A more specific object is to provide novel methods and apparatus for separating skins from the flesh or meat of products such as partially cooked potatoes in a relatively rapid and continuous operation.

Another object is to provide novel methods and apparatus for continuously and efficiently separating skins, hard spots, and the like by mechanical means from the flesh of vegetables and fruits.

Another object is to provide novel and improved methods and apparatus for treating fruit and vegetable products in the most efficient manner so as to separate the skins, hard spots, and other unsuitable portions of the product from the most suitable and edible portions of the flesh of that product.

Another object is to provide novel and improved methods and apparatus capable of simple, quick, and effective adjustment to varying conditions of the product to thereby insure optimum results in the separation of the flesh from the undesired portions thereof.

Another object is to provide novel and improved methods and apparatus for separating the desirable and edible portions of fruit and vegetable products from the skins and undesirable portions thereof which will maintain the separated product in optimum condition for subsequent usage.

These and other objects of the invention will become apparent from reading of the attached description together with the drawings wherein:

FIG. 4 is a vertical sectional view on an enlarged scale taken along line 4—4 of FIG. 1;

FIG. 5 is a vertical fragmentary sectional view on a still greater scale taken through the area where the doctor wheel, perforated drum, and pneumatic tire cooperatively act upon the product to separate the flesh from the skins, etc, thereof;

FIG. 6 is a fragmentary vertical sectional view on an enlarged scale of the area of FIG. 4 illustrating the skin loosening action of the compressed air released against the interior surface of the perforated drum;

FIG. 7 is a fragmentary elevational view on an enlarged scale of a portion of the perforated side wall of the drum;

FIG. 8 is a fragmentary sectional view taken on an enlarged scale along line 8—8 of FIG. 2; and, FIG. 9 is a perspective view of the apparatus comprising the invention.

Figure 9:
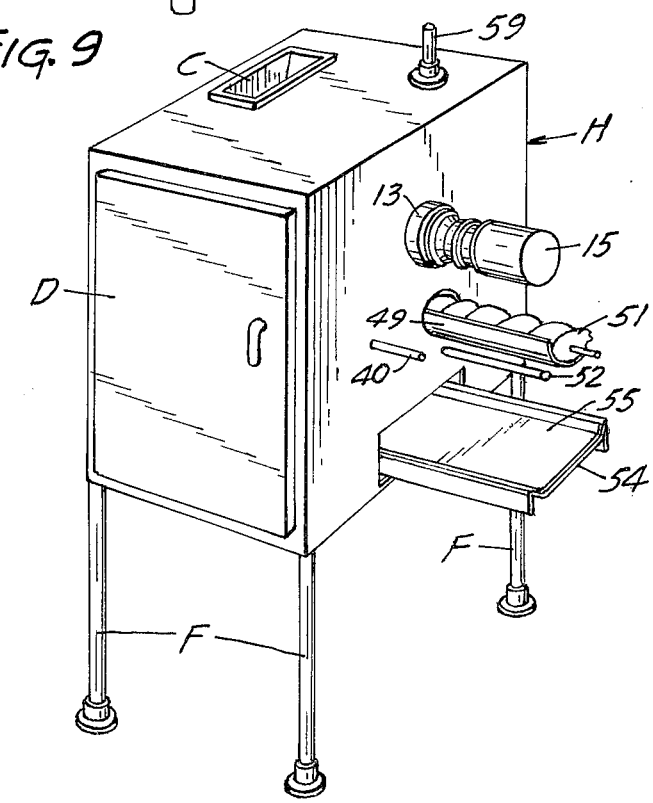

The preferred form of my invention is shown in FIGS. 1 - 9 inclusive and includes a frame F supporting a housing H having a removable door D and feed chute C as shown in FIG. 9. Within the interior of the housing H and fixedly secured thereto is a mounting plate or panel 10 which includes a rectangular support section 11 at its upper end.

Rotatably mounted through the use of bearings 12 and 13 within the rectangular section 11 of the mounting panel 10 is a horizontal drive shaft 14 which is driven by an SCR type variable speed electrical drive motor 15. Upon the opposite end of the drive shaft 14 is a doctor wheel 16, the exterior surface of which is provided with a plurality of axially extending corrugations 17.

Figure 1:
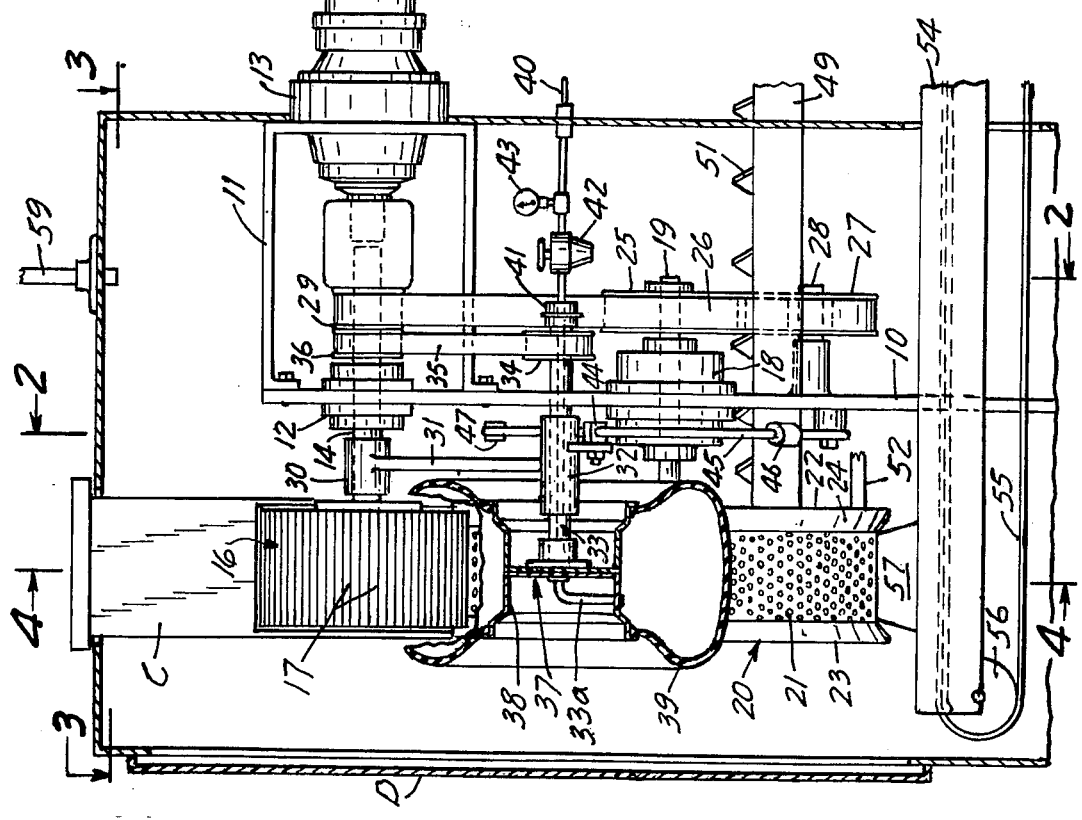
FIG. 1 is a vertical sectional view of the apparatus taken along lines 1—1 of FIG. 2.
Figure 3:
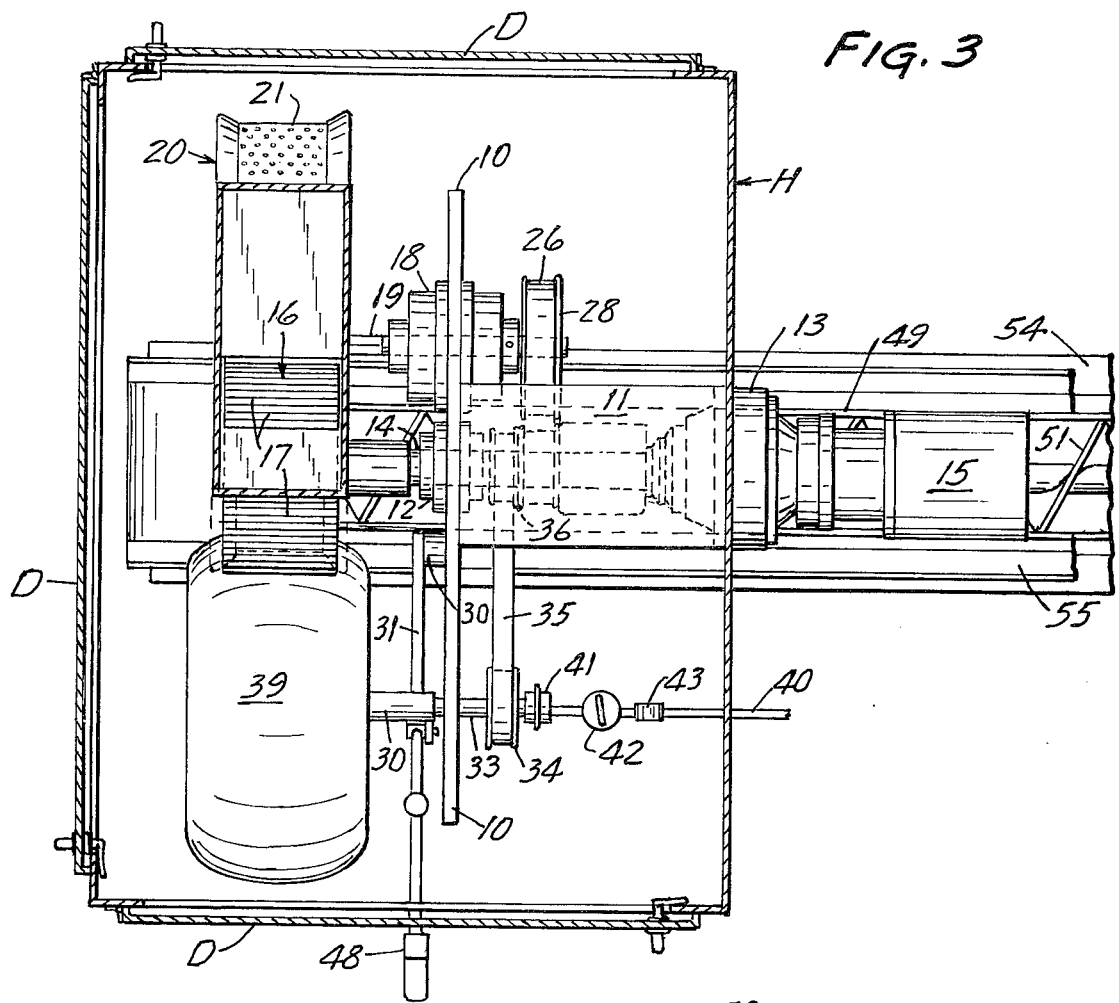
FIG. 3 is a horizontal sectional view taken along line 3—3 of FIG. 1.

Mounted upon the mounting plate 10 in bearing 18 is a counter shaft 19 which carries a perforated drum 20 at one of its ends. The drum 20 is positioned directly below the discharge of the chute C and has circumferential walls which are perforated as best shown in FIGS. 1 and 3. The size of these perforations 21 is less than 3/16 inches in diameter and preferably 3/32 inches in diameter.

One end portion 22 of the drum 20 is open. Terminal flanges 23 and 24 are carried by the drum and extend radially and axially outwardly therefrom. A power transmitting wheel 25 is mounted on the opposite end of the shaft 19 and is driven by a belt 26 which passes around a reversing idler wheel 27. This idler wheel 27 is mounted upon a stub shaft 28 which is carried by the mounting plate 10 as best shown in FIG. 1. The belt 26 extends upwardly and around the drum drive wheel 29 which is also carried by the drive shaft 14.

Rotatably mounted on the drive shaft 14 adjacent the doctor wheel 16 is a pivot sleeve 30 which carries a radially extending pivot arm 31 which in turn carries a transverse bearing 32 at its outer end. Mounted for rotation within the bearing 32 is a counter shaft 33 which has an axial bore and supports a power transmitting wheel 34 adjacent its free end. A drive belt 35 extends around the wheel 34 and upwardly and around the tire drive wheel 36.

The shaft 33 carries a wheel indicated generally as 37 at its opposite end, the wheel having a tire rim 38 which supports a pneumatic tire 39 as best shown in FIG. 1. The tire 39 is wider than the axial length of the drum 20 with the result that its portions extend axially outwardly beyond the flanges 23 and 24 of the drum 20. This can best be seen by reference to FIG. 1.

An air conduit 40 which is connected to a source of compressed air (not shown) is connected by a rotary union 41 to the end of the shaft 33 so as to bring the conduit into communication with the bore of the shaft. This rotary union 41 is preferably of the type which can be purchased from the Johnson Corporation, Three Rivers, Michigan, is designed for pressures less than 150 p.s.i., and is identified as the type SA Johnson Rotary Pressure Joint. A regulating valve 42 and a pressure gauge 43 are interposed within the conduit 40 as shown in FIG. 1.

Figure 2:
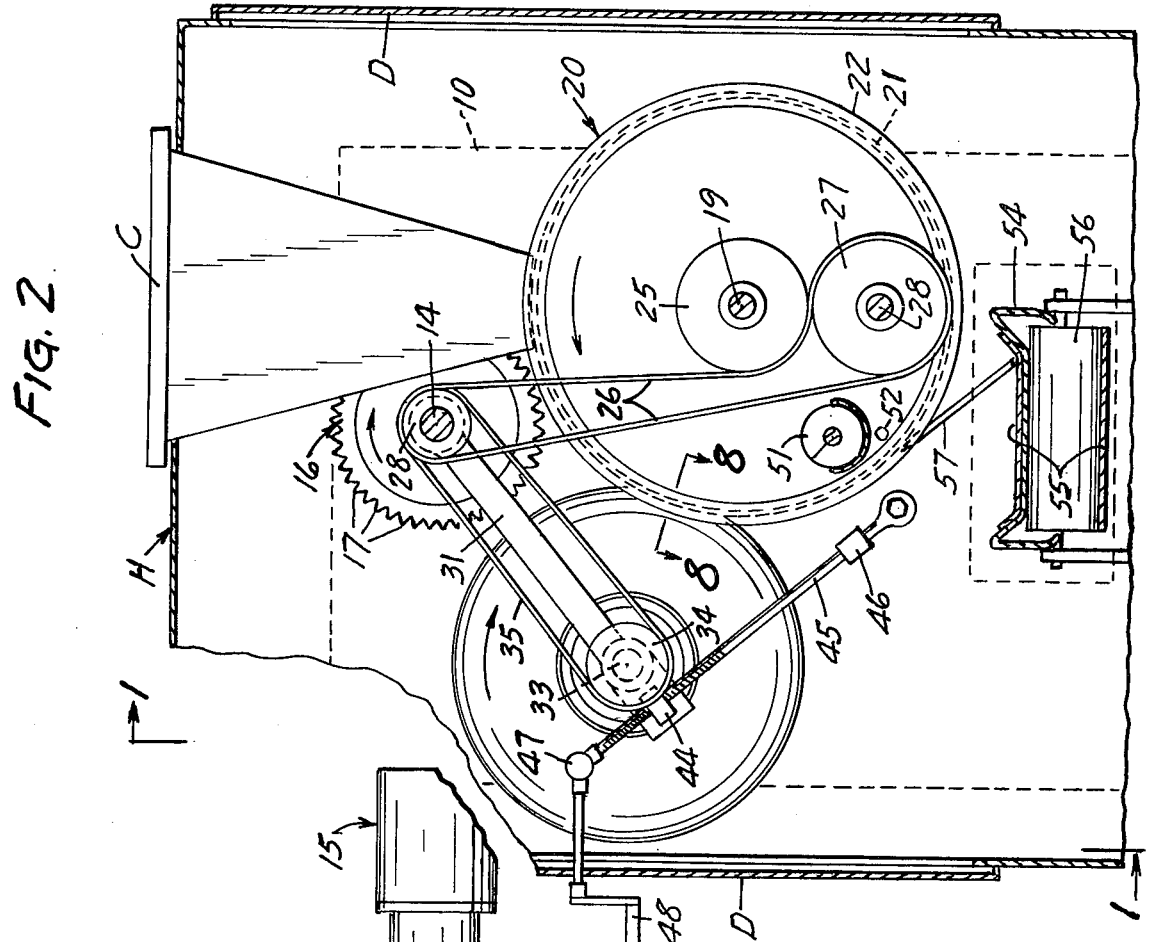
FIG. 2 is a vertical sectional view of the apparatus comprising the invention taken along line 2—2 of FIG. 1.

Pivotally mounted upon the pivot arm 31 is a threaded nut 44 which is adapted to pivot about an axis extending at right angles to the arm and to threadedly receive threaded rod 45 as best shown in FIG. 2. This threaded rod 45 is pivotally mounted on the mounting plate 10 and has a joint 46 which enables it to rotate about its longitudinal axis so as to cause the nut 44 to move toward or away from the point of connection of the rod 45 to the mounting plate, depending upon its direction of rotation. The rod 45 is driven by an appropriate gear mechanism 47 at its upper end which in turn is connected to a crank 48 by means of which the gear mechanism may be driven. The counter shaft 33 swings within a slot in the mounting plate 10 which is cut in an arc about the drive shaft 14 to permit the tire 39 to be moved toward or away from the perforated circumferential surface of the drum 20 as desired.

Mounted within the interior of the drum 20 is a trough 49 which extends parallel to the axis of the drum 20 and has one side wall thereof, as best shown in FIG. 4, extending upwardly and outwardly and terminating in a scraper element 50. A power driven rotary auger 51 is disposed within the trough 49 and functions to carry the flesh of the product, scraped from the interior surface of the drum 20, axially outwardly beyond the confines of the drum and the housing H as best shown in FIGS. 4 and 9.

Also disposed within the interior of the drum 20 is an air pipe 52 which has a plurality of perforations 53 along its length disposed so as to direct compressed air against the interior surface of the perforated circumferential wall of the drum 20 so as to loosen the skins and other material remaining upon the exterior surface of the drum after it is passed between the drum 20 and the tire 39. The air pipe 52, of course, is connected to a source of compressed air (not shown). Mounted exteriorly of the drum 20 and therebelow is a platform or trough 54 which is of generally flattened U-shape and supports a continuous belt 55 thereupon. The belt 55 passes around an end roller 56 and also extends around a similar, but not shown, driven roller at its opposite end so as to constitute a continuous conveyor constructed and arranged to move the skins, peelings, etc, deposited thereupon as the latter is loosened by a blade or scraper member 57 mounted immediately thereabove in position to bear against the exterior surface of the perforated circumferential wall of the drum 20 or positioned immediately adjacent thereto, so as to effectively remove the skins and other material which fail to pass through the perforations of the drum 20 as they are compressed between the tire 39 and the drum. The scraper 57 may be mounted in any suitable fashion as long as it is positioned with its sharpened end immediately adjacent the exterior surface of the drum 20 and above the belt 55 as best shown in FIG. 4.

In operation, the product to be separated is fed into the chute C as best shown in FIG. 4. Shown in FIG. 4 is a plurality of slices 58 of partially cooked potatoes which move between the doctor wheel 16 and the drum 20, the pieces of potato being positively engaged and doctored into a uniform layer upon the exterior perforated surface of the drum between its flanges 23 and 24. This uniform layer then progresses to a point where it is engaged by the rotating tire 39 and thereat the product is compressed sufficiently so that the flesh or meat thereof is forced through the perforations 21 of the drum to the interior surface while the peelings or skins, hard spots, and other blemishes, which constitute relatively hard or fibrous material remain upon the exterior surface of the drum and move, as shown in FIG. 4, downwardly to a position opposite the openings 53 in the air pipe 52 at which point they are effectively loosened by the blast of air directed thereagainst from the inside. At this point, the undesired material is loosened and may even drop upon the conveyor belt 55 and is carried away to a point exterior of the housing H. If not completely loosened, the scraper 57 completes the separation and removal of the remaining skins, etc., so that the surface of the drum 20, after it passes the scraper, will be clean and prepared to receive additional quantities of the product as it passes below the discharge end of the chute C upon its return to a position opposite thereto.

The flexible resilient tire 39 has proved to be an ideal way of applying sufficient pressure to the fruit or vegetable product so as to cause the flesh thereof to move through the perforated drum while at the same time permitting the skins and relatively undesirable portions of the flesh to remain on the exterior and thereby be separated from the desired portions of the product. Through the use of a resilient surface such as that of the tire 39 and through the use of the means for adjusting the pressure exerted thereby upon the exterior surface of the drum 20, it is possible to effectively and efficiently separate the desirable portions of the flesh from the undesirable portions thereof and from the skins or peelings covering the same. It is possible through the use of my apparatus to adjust the extent of pressure exerted by the tire 39 very accurately and thereby compensate for a difference in pressure required to separate flesh of different types of material from their skins and even different batches of the same product which may have different qualities. For example, it may be desirable to utilize potatoes which have been cooked to different degrees, depending upon the product to be made ultimately therefrom. Likewise, different products will require different degrees of pressure. In each instance, it is imperative that only sufficient pressure be applied to force the desired fleshy portion of the product through the perforations of the drum without forcing any of the skins, peelings, hard spots, or other blemishes therethrough. In this manner, a highly desirable degree of perfection in the separation of the desired portions of the product can be accomplished.

In the apparatus described above, it is possible to adjust the pressure exerted by the tire 39 in two different ways. First of all, the large variations in pressure can be accomplished through rotation of the crank 48 so as to cause the pivot arm 31 to move toward or away from the axis of the drum 20, since rotation of the crank will cause the rod 45 to rotate about its longitudinal axis and through the threaded cooperation of the nut 44, move the arm 31 either upwardly or downwardly as desired. After the major adjustment has been made in this manner, relatively minor adjustments can be accomplished by varying the amount of air pressure applied to the interior of the tire 39 through manipulation of the valve 42. This may be accomplished while the apparatus is at rest or while the tire is rotating, as it is desired, since the rotary union 41 permits such adjustment to be made while the separating process is in operation. I have found that through the use of this apparatus and these methods, the skins or peelings and hard spots and other undesirable blemishes in food products can be efficiently separated in a continuous operation and that optimum separating conditions may be maintained during the operation of the process through adjustments of the pressure applied by the tire 39 as described above.

Since it is important that the moisture content of certain products be maintained during the separating operation, I have provided for the introduction of steam into the interior of the housing H by way of a conduit 59 as shown in FIGS. 1 and 9. In this manner, the desired end product may be maintained in optimum condition for subsequent usage.

It should be noted that the drum 20, tire 39 and doctor wheel 16 are each driven by the motor M and that they have the same peripheral speed, the drum being rotated in a direction opposite to the direction of rotation of the tire and doctor wheel.

Therefore, in considering the present invention, it should be remembered that the present disclosure is illustrative only and the scope of the invention should be determined by the appended claims.

What is claimed is:

1. A hard spot and skin remover for at least partially cooked potatoes comprising,
   a. a perforated drum mounted for rotation about its axis,
   b. an interiorly pressurized flexible and resilient tire mounted for rotation about an axis substantially parallel to said first mentioned axis in position so that its circumferential surface engages the perforated surface of said drum as the latter rotates to cooperatively force the flesh of such potatoes when disposed therebetween through the perforations of said drum and thereby effectively separate the hard spots and skins therefrom,
   c. doctor means mounted adjacent said drum and constructed and arranged to doctor such potatoes when applied to said drum into a layer of uniform thickness upon said perforated drum surface ahead of said tire,
   d. means for rotating said drum and said tire in opposite directions to cause such potatoes when so doctored upon said drum to be moved between said engaging surfaces of said drum and said tire, and
   e. pneumatic means mounted adjacent the perforated surface of said drum opposite the surface thereof engaged by said tire and constructed and arranged to project a pneumatic flow toward the said adjacent perforated surface to effectively loosen the skins and hard spots which have been separated from the flesh and adhere to the surface engaged by said tire.

2. The structure defined in claim 1 and means connected to said tire for varying the interior pressure therewithin as desired while said tire is rotating.

3. The structure defined in claim 1 wherein the said engaging surfaces of said drum and said tire are rotated at the same peripheral speed.

4. The structure defined in claim 1 wherein said doctor means is comprised of a driven doctoring wheel the circumferential surface of which is roughened to facilitate the engagement of such potatoes thereby and the doctoring thereof into such a layer of uniform thickness upon said perforated drum surface ahead of said tire.

5. The structure defined in claim 1, and
   f. steam enclosure means surrounding said drum and said tire and said doctor means, and
   g. means for releasing steam within said enclosure means for maintaining the flesh of such potatoes at the desired moisture-content level.

6. The structure defined in claim 1, and
   f. means associated with said rotating drum for depositing at least partially cooked potatoes upon the perforated surface thereof ahead of said doctor means.

7. The structure defined in claim 1, and
   f. mechanical means associated with said drum for removing the separated potato skins from the perforated surface of the drum engaged by said tire.

8. The structure defined in claim 1, and
   f. conveyor means associated with said drum for removing therefrom potato flesh forced through the perforations of said drum.

9. The structure defined in claim 1, and
   f. means for varying the pneumatic pressure within said tire to the optimum level for causing the skins to separate from the flesh of such cooked potatoes without passing through the perforations of said drum.

10. The structure defined in claim 1 wherein said drum and said tire are driven at the same peripheral speed.

11. The structure defined in claim 1, wherein said doctor means is comprised of a rotary doctoring member mounted for rotation about an axis substantially parallel to said first mentioned axis and being driven at substantially the same peripheral speed as the surface of said drum engaged by said tire.

12. The structure defined in claim 1, wherein said structure includes adjustable mounting means for said drum and said tire whereby the center distance between the axes of said drum and said tire may be varied as desired to vary the extent of pressure of said tire against said perforated surface of said drum.

13. The structure defined in claim 1, wherein said doctor means is comprised of a driven rotary doctor wheel and said structure includes variable-speed drive means connected in driving relation to each of said drum, tire, and doctor wheel, and drives each thereof at the same peripheral speed.

14. The structure defined in claim 1 wherein said tire engages the exterior surface of said drum.

15. The structure defined in claim 1, wherein said drum carries a pair of axially spaced circumferential flanges extending radially along opposite sides of said tire and cooperating therewith to prevent the escape of the flesh of such potatoes from between said drum and said tire and thereby facilitate the separation of the skins from the flesh.

16. The structure defined in claim 1, and
   f. a trough mounted within said drum and extending axially thereof,
   g. an auger type conveyor mounted for rotation about its longitudinal axis within said trough for moving the flesh of such potatoes out of said drum,
   h. means connected to said conveyor for driving the same, and
   i. a scraper member associated with said trough and extending from a position adjacent thereto to a position immediately adjacent the inner surface of said perforated drum and scraping the potato flesh therefrom and directing the same into said trough.

17. A potato ricer comprising,
   a. a ricer member having a perforated surface adapted to receive and support cooked potatoes thereupon,
   b. a pneumatically inflated pressure-application member movably mounted in engaging relation with said perforated surface of said ricer member and having a cooperative potato-engaging surface positioned to engage cooked potatoes in cooperation with such perforated surface of said ricing member when such potatoes are placed thereupon and to force the flesh of such cooked potatoes therethrough,
   c. said pressure-application member surface being directly supported pneumatically under pressure less than 150 p.s.i. and being resilient and flexible to an extent sufficient to permit the same to stretch and extend around the imperfections in the potato and permit the same and the skins of such potatoes to remain on said perforated surface while the flesh thereof is forced therethrough by said pressure-application member, d. means for removing the separated skins of such potatoes from said perforated surface of said ricing member, and e. drive means for moving said pressure-application member to cause the same to force the flesh of such cooked potatoes through said ricing member.

18. The structure defined in claim 17, and f. means connected with said members for varying the pneumatic support of said flexible and resilient surface and facilitating the separation of the skins from the flesh of such cooked potatoes.

19. A potato ricer comprising, a. a drum mounted for rotation about its axis and having a perforated circumferential surface adapted to receive cooked potatoes and the like thereupon and, b. a rotary member mounted for rotation adjacent said drum and having a directly pneumatically supported flexible and resilient circumferential surface engaging said perforated surface of drum at pressures less than 150 p.s.i., but with sufficient pressure to cause the flesh of cooked potatoes to separate from their skins and pass through said perforations of said drum when such cooked potatoes are passed therebetween, and, c. drive means connected with said rotary member and said drum for rotating the same.

20. The structure defined in claim 19, and, g. means connected with said rotary member for varying the pneumatic pressure supporting said circumferential surface of said rotary member to create the optimum pressure by said rotary member against said perforated surface for causing the skins to separate from the flesh of such potatoes and remain upon said circumferential surface of said drum.

21. A flesh and skin separating device for fruits and vegetable products comprising:

a. a perforated drum mounted for rotation about its axis, b. an interiorly pneumatically pressurized flexible tire mounted for rotation about a substantially parallel axis in position so that its circumferential surface engages the perforated surface of said drum at less than 150 p.s.i. as the latter rotates to cooperatively force the flesh of such a product when deposited therebetween through the perforations of said drum and thereby effectively separate the skins therefrom, and c. means for causing said drum and said tire to rotate in opposite directions while in said engaging relation to cause such a product when deposited upon said drum to be moved between said engaging surfaces of said drum and said tire.

22. The method of separating skins from the flesh of fruits and vegetable products consisting in:

a. passing such products between a rotating perforated product-receiving surface and an oppositely rotating directly pneumatically supported flexible, resilient surface in engagement therewith under pressure less than 150 p.s.i. whereby the flesh of such products are forced through the perforated surface and the skins of such products remain on such product-receiving surfaces.

23. The method set forth in claim 22, and b. varying the pneumatically supported pressure applied to the flexible resilient surface to an optimum pressure to thereby obtain the most efficient separation of the skins from the flesh of such products.

24. The method set forth in claim 22 and mechanically removing the separated skins from the product-receiving surface.

25. The method of separating skins from the flesh of fruit and vegetable products consisting in:

a. rotatably mounting the flexible resilient circumferential surface of a pneumatic tire inflated to a pressure less than 150 p.s.i. in engagement with the perforated circumferential surface of a rotatably mounted perforated drum, with the axes of the tire and drum substantially parallel, b. rotating the drum and tire in opposite directions while in such engagement, and c. passing such products between the engaging surfaces of the tire and drum while under sufficient pressure to cause the same to effectively force the flesh of such products to separate from the skins thereof and pass through the perforations of the drum.

26. The method of separating skins from the flesh of fruits and vegetable products consisting in:

a. passing such products between a rotating perforated product-receiving surface and an oppositely rotating directly pneumatically supported flexible, resilient surface in engagement therewith under pressure less than 150 p.s.i. whereby the flesh of such products remain on such product receiving surfaces, and b. pneumatically loosening the separated skins on the product-receiving surface preparatory to removing same.

* * * * *